(12) United States Patent
Ban et al.

(10) Patent No.: US 7,882,188 B2
(45) Date of Patent: Feb. 1, 2011

(54) SYMBOL-BASED MESSAGE TRANSMISSION METHOD AND SYSTEM

(75) Inventors: Oliver K. Ban, Austin, TX (US); Chun C. Wang, Shenzhen (CN); Michael Bi, Shenzhen (CN)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 11/843,674

(22) Filed: Aug. 23, 2007

(65) Prior Publication Data

US 2008/0059593 A1 Mar. 6, 2008

(30) Foreign Application Priority Data

Aug. 29, 2006 (CN) .......................... 2006 1 0126584

(51) Int. Cl.
*G06F 15/16* (2006.01)
(52) U.S. Cl. .................... 709/206; 709/205; 709/207
(58) Field of Classification Search ................. 709/203, 709/206, 207, 205
See application file for complete search history.

(56) References Cited

U.S. PATENT DOCUMENTS

| | | | |
|---|---|---|---|
| 5,892,909 A * | 4/1999 | Grasso et al. ............... 709/201 |
| 6,377,978 B1 | 4/2002 | Nguyen | |
| 6,647,409 B1 | 11/2003 | Sherman et al. | |
| 6,684,088 B1 * | 1/2004 | Halahmi ..................... 455/566 |
| 6,832,264 B1 * | 12/2004 | Sheinwald et al. .......... 709/247 |
| 7,039,678 B1 * | 5/2006 | Halahmi et al. ............. 709/206 |
| 7,113,948 B2 * | 9/2006 | Jhingan et al. ............... 707/10 |
| 7,290,034 B2 * | 10/2007 | Budd et al. .................. 709/206 |
| 7,529,940 B1 * | 5/2009 | Winkel et al. ............... 713/170 |
| 2002/0016818 A1 * | 2/2002 | Kirani et al. ................ 709/203 |
| 2002/0178232 A1 | 11/2002 | Ferguson | |
| 2003/0055907 A1 | 3/2003 | Stiers | |
| 2003/0154254 A1 | 8/2003 | Awasthi | |
| 2003/0231661 A1 | 12/2003 | DePietro et al. | |
| 2004/0024826 A1 | 2/2004 | Halahmi et al. | |
| 2004/0024846 A1 * | 2/2004 | Randall et al. .............. 709/219 |
| 2005/0038863 A1 * | 2/2005 | Onyon et al. ................ 709/207 |
| 2005/0076085 A1 | 4/2005 | Budd et al. | |
| 2005/0076087 A1 | 4/2005 | Budd et al. | |

(Continued)

FOREIGN PATENT DOCUMENTS

CH 200610126584.2 8/2006

*Primary Examiner*—Michael Won
(74) *Attorney, Agent, or Firm*—George R. McGuire; David B. Woycechowsky; Bond Schoeneck & King, PLLC (57) ABSTRACT

The present invention discloses a method of message transmission performed in a server; a method of message transmission performed in a client; a symbol-based method for transmitting a message between a server and at least one client as well as a server; a client and a symbol-based message transmission system, wherein the symbol-based method of message transmission has: at least one client requesting the server to perform message transmission; the server transmitting symbols of the client's message to the client; and presenting the received message symbols on the client. The symbol-based method of message transmission saves a great deal of bandwidth of the communication channel by having the server only transmit symbols that represent the message after receiving a message transmission request from the client. This is done in order to efficiently transmit a message with a large body and/or attachment(s), thereby avoiding the risk of blocking the communication channel.

22 Claims, 4 Drawing Sheets

U.S. PATENT DOCUMENTS

2006/0143714 A1* 6/2006 Peterson et al. ............... 726/26
2007/0255792 A1* 11/2007 Gronberg .................... 709/206
2008/0216022 A1* 9/2008 Lorch et al. ................. 715/847

* cited by examiner

FIG.1

PRIOR ART

SYMBOL-BASED MESSAGE TRANSMISSION METHOD AND SYSTEM

RELATED APPLICATIONS

This application claims foreign priority benefits under Title 35, United States Code, Section 119 of Chinese Patent Application No. 200610126584.2, filed Aug. 29, 2006, the contents of which are hereby incorporated by reference.

FIELD OF THE INVENTION

The present invention relates to the field of message transmission, and specifically to a symbol-based message transmission method and system.

BACKGROUND OF THE INVENTION

Modern communication systems may be classified according to the information transmitted. For instance, time-sensitive information is transmitted in a synchronous channel while time-insensitive information is transmitted in an asynchronous channel. An example of a synchronous channel is a television (TV) channel. An example of an asynchronous channel is an email channel in which the transmitted time-insensitive information is an email message.

Generally, an email system, and in a broader sense a message transmission system, employs a client-server structure, wherein a mail server supports standard internet mail service protocol such as Simple Mail Transfer Protocol (SMTP)/Post Office Protocol version 3 (POP3) to send and receive an email message. An email application program running on a client can access the mail server and upload emails to and download emails from the mail server. The transmission of email is usually performed with the SMTP protocol. When an email arrives at the receiver's mail server, the mail receiver's client downloads the email from the mail server by using the POP3 protocol.

Figure 1:
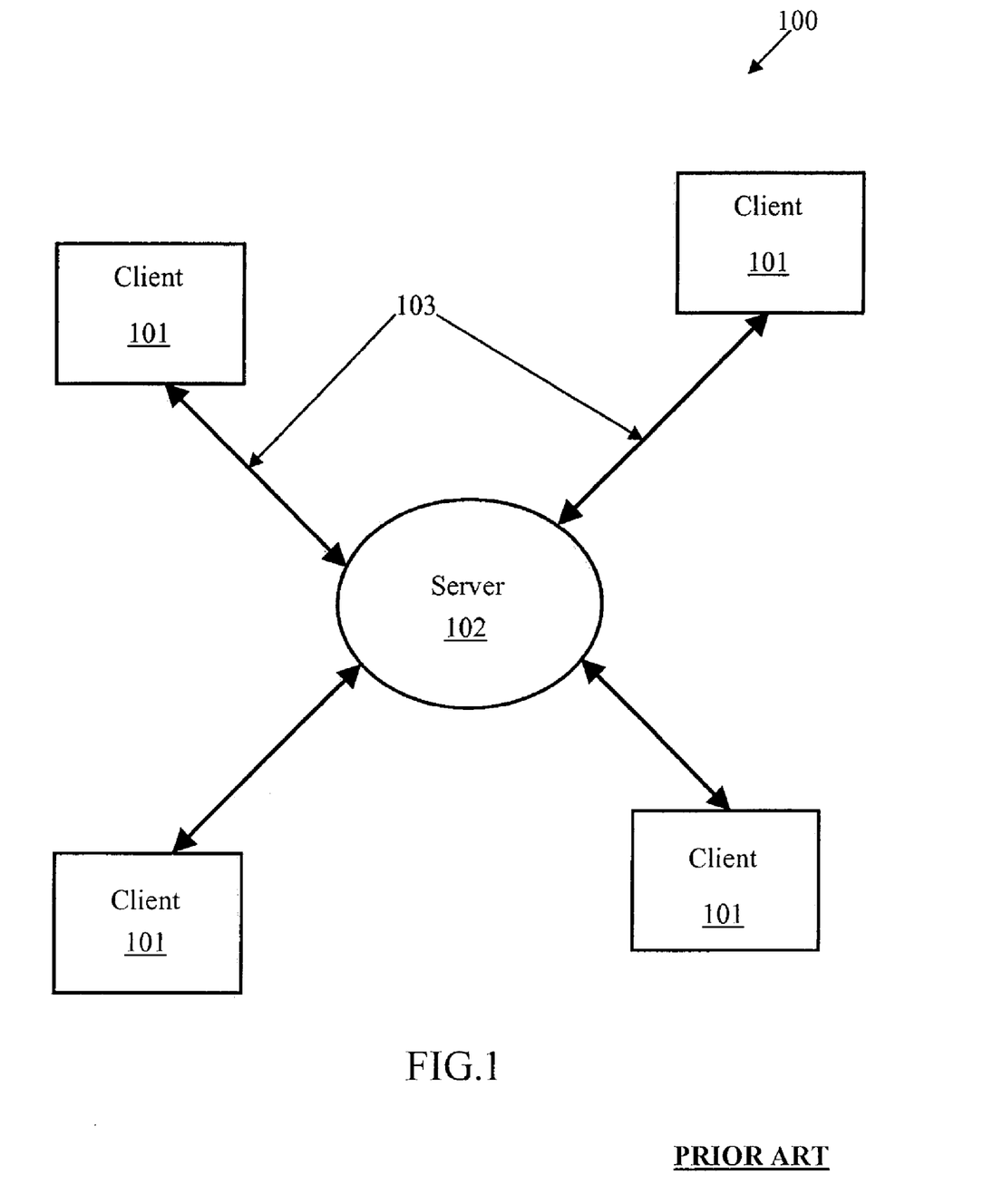
FIG. 1 shows a block diagram of a typical client-server type of message transmission system of the prior art.

FIG. 1 is a schematic diagram of a typical client-server type of message transmission system 100. A plurality of clients 101 can be connected to a server 102, and the messages are transmitted via communication channels 103 between the clients and the server.

When a message handling application program is running on a client 101, the message handling application program first handshakes with server 102 to establish communication channel 103 between the client and the server. The program then starts to download messages such as new email from server 102 via communication channel 103. Such message transmission usually works well under the assumption that the following two conditions are met: the communication channel between the client and the server has sufficient bandwidth; and neither the body nor the attachment of the message being transmitted is too large.

However, it is often the case that at least one of the two abovementioned conditions is not satisfied. For instance, a user may encounter the case of downloading an email message with multiple big attachments. In this case, if the message-handling application program running on the client attempts to download through, for example, a narrow-band communication channel established by a 56 kbps telephone modem or through a noisy wireless network with a plurality of reconnection blocking channels, then problems of low message download speed will occur and the communication channel is likely to be blocked.

Transmitting a symbol of the attachment instead of the attachment itself can solve the problems caused by the large attachment of a message. A method for managing the download of email attachments is disclosed in U.S. Patent Application Serial No. 2005/0076087, entitled "Method and System for Email Synchronization for an Electronic Device." In this patent application a client's email service component first receives and checks the property of the email sent by a server. The property indicates whether there is an attachment or an embedded link associated with particular email messages. Thus, the email service component determines whether one or more attachments are associated with the email. The email service component then receives detailed information of the attachment properties including the name of the attachment, the type of the file, and the size from the server. The email service component receives the email without the attachments, and displays the received email and attachment list to the user. If the user selects one attachment from the attachment list, then the email service component downloads the selected attachment via a background thread. This solution is suitable for the case where the body of the email is small. However, for a message in which the body of the email message is itself embedded with a large amount of text or media content, this solution will also have the problems of low message download speed and channel overload, thereby blocking the narrow communication channels between the clients and the server.

When the body of the transmitted message is very large, the capacity of the communication channels between the clients and the server will be overloaded. The typical symptom is that the user lost control of the whole process because both the client applications and the communication channel are busy finishing the downloading process.

Existing solutions are based primarily on the following assumptions: the body of the message is based on a relatively small amount of text, and the media content are encoded in the attachment. Thus, only the attachment needs to be symbolized and transmitted, while the body of the message with a small amount of text is transmitted directly to the client from the server without the risk of blocking the communication channel.

However, more applications have started to directly encode or dump media content such as compressed or uncompressed audio and video into the message body. As a result, the message body becomes very large. It will cause the abovementioned channel overload problem if the message body itself is directly transmitted. Therefore, the existing solutions may process the normal messages effectively, but lack the capability to process a message in which the body includes large media content.

In addition, person-to-person communications normally use a text body and attachment format while person-to-machine and machine-to-machine communications normally use a non-attachment format. The increase in machine-to-machine communications traffic is much greater than person-to-person communications traffic growth. There will be an increasing number of messages without an attachment in the communications since most of the person-to-person communications need to go through multiple machine-to-machine communication steps.

Examples of existing technical solutions are listed hereinbelow. Nguyen, in U.S. Pat. No. 6,377,978 describes a method and system for dynamic downloading of hypertext electronic mail messages. Ferguson, in U.S. Patent Application No. 2002/0178232 describes a method for maximizing the use of available bandwidth while browsing the World Wide Web section of the Internet, by allowing users to dynamically pre-select content to be viewed next. Awasthi, in U.S. Patent Application No. 2003/0154254 is directed to a system for processing a message received from a computational network. Budd et al., in U.S. Patent Application No. 2005/0076087 describes an electronic device, such as a hand-held portable computer, provided with client-side email capability that allows emails to be independently downloaded from a server, regardless of an operating mode of an email application and without using the standard email retrieval mechanism of the email application. Budd et al., in U.S. Patent Application No. 2005/0076085 describes an electronic device, such as a hand-held portable computer provided with client-side email capability that allows emails to be independently downloaded from a server, regardless of an operating mode of an email application and without using the standard email retrieval mechanism of the email application. Halahmi et al., in U.S. Patent Application No. 2004/0024826 describes a system and method for providing e-mail messages to a user in a more efficient manner. Stiers, in U.S. Patent Application No. 2003/0055907 describes a method to reduce the network capacity usage of electronic email containing MIME-encoded attachments. DePietro et al., in U.S. Patent Application No. 2003/0231661 describes a method and apparatus for rapidly downloading large files over a broadband communications link to a user, segments the file into multiple segments and assigns the segments to be transmitted over a plurality of in-band or out-of-band channels. Kirani et al., in U.S. Patent Application No. 2002/0016818 describes an e-mail system that re-packages message attachments optimized for delivery to wireless handheld devices.

In summary, the existing technical solutions cannot accommodate a message transmission type with following features:

1. the communication channels are unevenly distributed in a client-server type of message transmission system;

2. the size of the messages transmitted in the message transmission system are unevenly distributed, especially for the case of a message body embedded with large media content; and 3. the message transmission process itself has uneven timing: at the first instance that a client establishes a connection with a server, the client does not have enough communication channel capacity to download the message body. However, after the initial download, the channel capacity is underutilized due to no need for further download operations.

Additionally, some proposed solutions solve the initial download channel capacity problem, but these solutions do not also solve the uneven channel capacity utilization problem.

SUMMARY OF THE INVENTION

In view of the technical problems described hereinabove, the present invention provides a symbol-based message transmission method and system that efficiently solves the problem of channel blocking due to the case when the message body itself is very large, and makes fuller use of communication channel capacity.

According to a first aspect of the present invention, there is provided a method of message transmission performed in a server, the steps comprising receiving a request to transmit a message from at least one client, and transmitting symbols of the message to the at least one client.

According to a first aspect of the present invention, there is provided a method of message transmission performed in a server, the steps comprising receiving a message for at least one client, transforming portions of the message into a set of symbols representative thereof, receiving a request to transmit the message from the at least one client, and transmitting the set of symbols to the at least one client.

According to a third aspect of the present invention, there is provided a method of message transmission performed in a client, comprising the steps of requesting a server to transmit a message, receiving symbols of the message from the server by the client, and presenting the symbols to a user of the client.

According to a fourth aspect of the present invention, there is provided a server, comprising receiving means for receiving a request to transmit a message from at least one client; first storage means for storing the message of the at least one client; transforming means for transforming portions of the message into a set of symbols representing at least one of: a title, a body and an attachment of the corresponding message; second storage means for storing the set of symbols; and transmitting means for transmitting the set of symbols to the at least one client in response to the request to transmit the message.

According to a fifth aspect of the present invention, there is provided a client, comprising requesting means for requesting a server to transmit a message, receiving means for receiving symbols representative of the message from the server; presenting means for presenting the symbols to a user of the client, and downloading means for automatically downloading in the background at least one of: a body and an attachment of the message from the server.

According to a sixth aspect of the present invention, there is provided a symbol-based method for transmitting a message between a server and at least one client, the steps comprising at least one client requesting a server to transmit a message, the server transmitting symbols representative of the message to the at least one client, and presenting the symbols on the at least one client.

According to a seventh aspect of the present invention, there is provided a symbol-based message transmission system comprising a server and at least one client. The server further comprises receiving means for receiving a request to transmit a message from at least one client; first storage means for storing the message of the at least one client; transforming means for transforming portions of the message into a set of symbols representing at least one of: a title, a body and an attachment of the corresponding message; second storage means for storing the set of symbols; and transmitting means for transmitting the set of symbols to the at least one client in response to the request to transmit the message. The at least one client further comprises requesting means for requesting the server to transmit the message; receiving means for receiving the set of symbols representative of the message from the server; presenting means for presenting the set of symbols to a user of the client; and downloading means for automatically downloading in the background at least one of: the body and the attachment of the message from the server.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENTS

Figure 2:
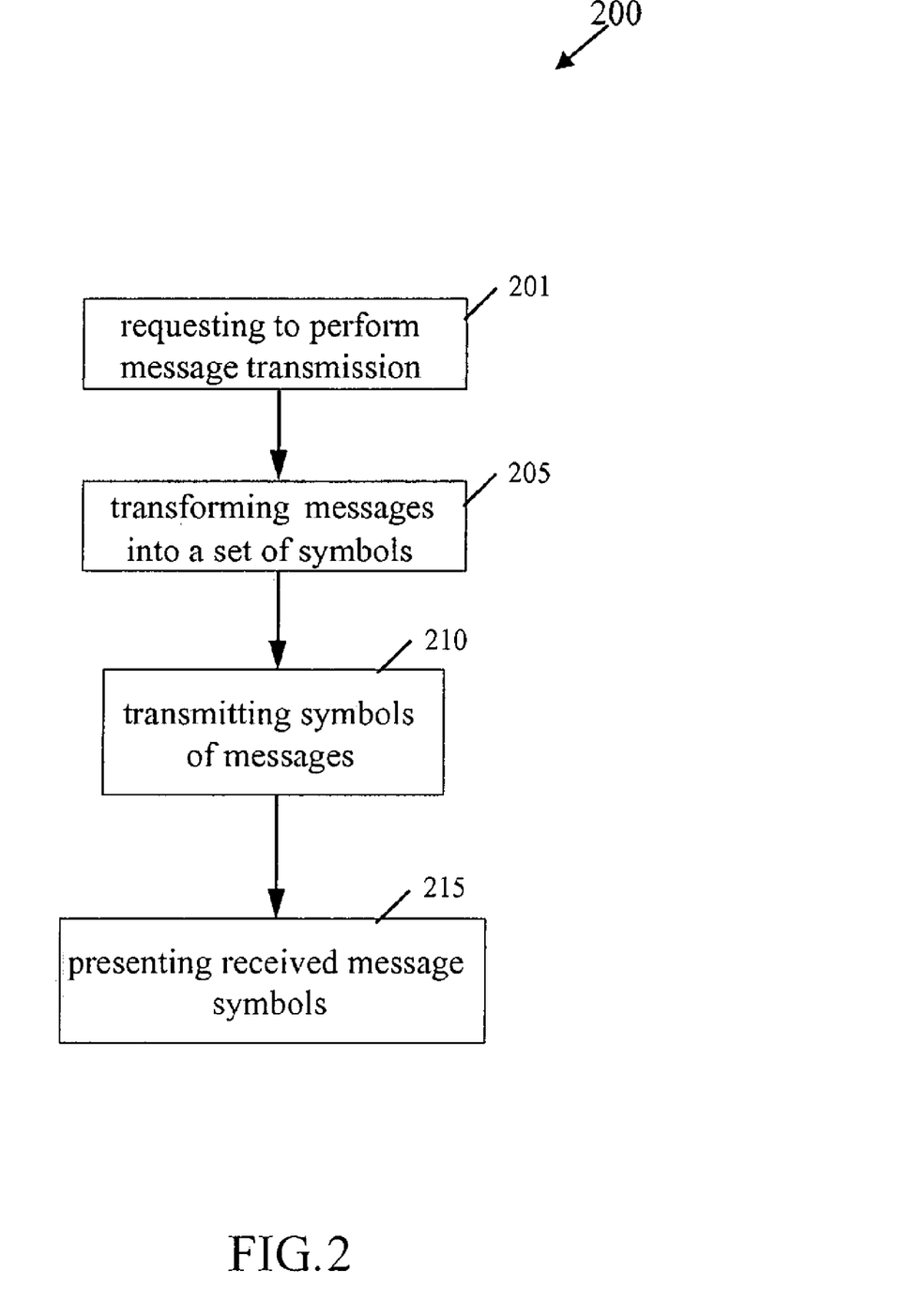
FIG. 2 shows a flowchart of the symbol-based message transmission method in accordance with one embodiment of the present invention.

Referring now to FIG. 2, there is shown a flowchart 200 of the symbol-based message transmission method in accordance with one embodiment of the present invention. Generally speaking, the inventive concept is to use different transmission manners, or methods, at different communication stages of message transmission to best utilize communication channel capacity.

The method described in this embodiment is applied to a typical client-server type of message transmission system but for clarity, the following description describes the method of performing the message transmission process between a server and only one client. For those skilled in the art, it is easy to understand that this embodiment is equally applicable to message transmission between a server and a plurality of clients.

Referring still to FIG. 2, at step 201 the client requests the server to perform message transmission. More specifically, the client first establishes a connection with the server. Methods for realizing this connection are well known in the art and include, for example, the client and the server performing a handshake process to establish the connection. The client then sends the message transmission request to the server to request the server to transmit the client's message.

At step 210, the server transmits the symbols of the client's message to the client. One definition of a symbol is a link to an object, much like a person's name is a link to that actual person. One definition of an object, as it relates to computing, is any item that can be individually selected or manipulated, as a picture, data file, or a piece of data or text. In this embodiment, the symbols are generated by the server transforming respective portions of each message. Preferably, the client's message is that portion of the message that has not been read by the user of the client.

The symbols of a message may be generated in many different ways by those skilled in the art including the two following examples:

1. each time the server receives the client's message, the server transforms respective portions of the message into a set of symbols; the server then stores the symbols into a related storage module waiting to be transmitted; and 2. after receiving the client's message transmission request, the server transforms the respective portions of the client's message into a set of symbols that includes three symbols that respectively represent the title, the body and the attachment of the corresponding message. This is the preferred way to generate the symbols of the message for this embodiment, step 205.

Statistics show that in most instances, the sizes of the components that make up a message in order of increasing size are the title, the body and the attachment(s). To realize effective transmission of a message with large body and make fuller use of channel capacity, the bottleneck to be solved is transmitting the body and attachment(s) of the message. Therefore, in this embodiment the title, the body and the attachment of the message are all symbolized. In this way, the objects of the message having a large size are represented by symbols having a small size, thereby saving the bandwidth of the communication channels.

In one particular embodiment, a symbol that represents the title is used to indicate the message's name; a symbol that represents the body is used to indicate the size of the message's body; and a symbol that represents the attachment is used to indicate the name, type, and size of the message's attachment of course, those skilled in the art will appreciate that these symbols may be used to indicate other information.

Each individual symbol in the overall set of symbols corresponding to the message in this specific embodiment take the following form: Header ID, Header Address, Header Checker, Header Size, Payload ID, and size. For those skilled in the art, it is understood that other forms may be used to represent the structure of above symbols.

When the server receives a message transmission request from the client, step 201, and the server transforms the message(s) into a set of symbols, step 205, the server first transmits the title symbols of the client's messages to the client so that the user of the client immediately knows the number of messages being received and the name of each message, step 210. Next, the symbols of the bodies of the messages are transmitted to the client so that the user knows the size of each body without actually downloading each body itself. Finally, the attachment symbols of all of the messages are transmitted to the client so that the user knows characteristics such as the name, the type, and the size of the attachments associated with each message to help the user further decide whether these attachments should be downloaded. A great deal of bandwidth is saved since the server transmits only the symbols of the three objects of the message and not the objects themselves.

In addition to successively transmitting the title, body and attachment symbols, the server may transmit the entire set of symbols of each message directly to the client. Of course, those skilled in the art will readily understand that other transmission manners may be used to transmit the symbols of the message.

Finally, at step 215, the received symbols of the messages are presented on the client so that the user of the client may further process these symbols.

It can be seen from the above description that in the symbol-based message transmission method of this embodiment, after the server receives a message transmission request from a client, step 201, and the server transforms the message(s) into a set of symbols, step 205, the server transmits only the symbols of the message to the client, step 210, thereby saving a great deal of communication channel bandwidth and making it convenient to transmit a message having a large body and a small attachment without the risks of blocking the communication channel. The prior art describes a Multipurpose Internet Mail Extensions (MIME) formatted email attachment being transmitted via the internet, while this embodiment not only is being applied to any formatted attachment of email, but in a broader sense to any data being transmitted over any type of network.

Figure 3:
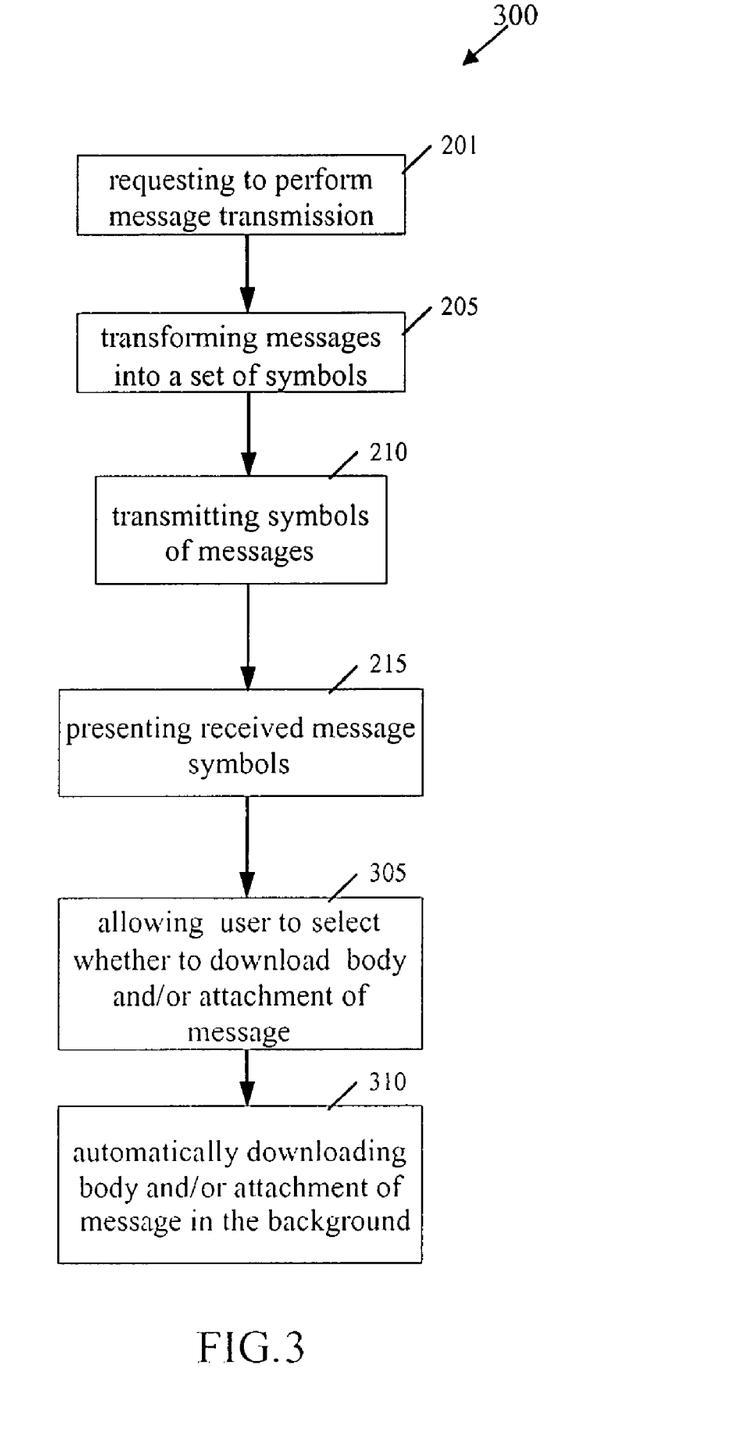
FIG. 3 shows a flowchart of the symbol-based message transmission method in accordance with another embodiment of the present invention.

Referring now to FIG. 3, there is shown a flowchart 300 of the symbol-based message transmission method in accordance with another embodiment of the present invention. The steps that are the same as those in FIG. 2 are marked with same reference numerals and further description of them is not believed necessary. When the client receives the symbols of the messages, the client automatically downloads the body and/or attachment(s) of the client's message from the server in the background, as shown in step 310 of this embodiment.

After the symbols of the client's message are transmitted to the client, step 210, the client is normally busy processing the received information. At this time, the download communication channel is actually underutilized. That is, there exists a large unused channel capacity. Thus, the client may automatically download the message's body and attachments, step

310, at full channel capacity in the background to make fuller use of the channel capacity. When the user of the client later decides to read the whole body of the message and/or attachments, the body and/or attachment(s) are available without further download.

Specifically, when the client has determined that the user is processing the received symbols of the message, it automatically downloads the body and/or attachment(s) of the message in the background, step 310. Alternatively, when the client has determined that all of the symbols of the messages have been received, it automatically downloads the body and/or attachment(s) of the message in the background. In a particular implementation, a daemon may be set in the client to monitor the above event that starts the background automatic download.

It should be understood by those skilled in the art that the client automatically downloading the body and/or attachment (s) of the message in the background, step 310, may be initiated by events other than the abovementioned ones. In one embodiment, the client automatically downloads the body and/or attachment(s) of the message according to predetermined priority algorithms (e.g., an address list priority algorithm, and/or a size priority algorithm). In another embodiment, the client automatically downloads the body and/or the attachment of the message according to the size of the bodies of the messages (e.g., in order of increasing size). In yet another embodiment, when the user of the client begins processing the symbols of a particular message, the client automatically downloads the body and/or the attachment(s) of that message in the background.

It can be seen from the above description that in the symbol-based message transmission method of this embodiment, the client continues to automatically download the body and/or the attachment(s) of the message in the background, which makes full use of the entire channel capacity to efficiently transmit a message with a large body and/or attachments, and solves the problem of uneven utilization of channel capacity in the prior art. Moreover, by downloading the body and/or attachment(s) of the message in the background, the client may quickly return control back to the user, thereby ensuring that the client user's other operations to the client will not be affected.

After step 215 (i.e., when the symbols of the message are transmitted to and presented on the client), the user of the client is then allowed to choose whether to download the body and/or attachment(s) of the message, step 305. Specifically, the user of the client, after reading the symbols that represent the objects of the message, may decide whether to download, select, or delete the corresponding objects depending on the network environment and the content and/or size of the objects, then performs step 310. This solution solves the problem of the client being accidentally hung up.

With solutions that use the existing email processing protocols, for example, Internet Message Access Protocol (IMAP), since IMAP transmits a message together with encoded symbols, the size and content briefings are not embedded in the message itself. For the case of a client presented with one thousand junk emails, it is not possible for the client to return control to the user using the existing technical solutions, whereas the present embodiment of the invention describes a solution where the symbols that represent the objects of the message are transmitted first, then the body and/or the attachment(s) of the message are automatically downloaded in the background. In this way, the client may return control to the user instead of possessing control through the entire message transmission process.

The same inventive concept provides for a message transmission method performed in a server. It comprises the steps of receiving a message transmission request from a client, and transmitting the symbols of the client's message to the client. In this method, the symbols of the client's message are also generated by the server transforming respective portions of the message. Since the specific implementation is the same as the transformation operation performed by the server in the abovementioned symbol-based message transmission method, further description is not believed necessary. Furthermore, since the transmission operation of the symbols of the message is also the same as that of the abovementioned symbol-based message transmission method, further description is also not believed necessary.

When the client automatically downloads the body and attachment(s) of the message in the background, the body and attachment(s) of the client's message are transmitted to the client at the server side.

According to this method, the server transforms the client's message into symbols and performs the transmission, which saves significant communication channel bandwidth between the client and the server, thus avoiding channel blocking.

The same inventive concept also provides for a message transmission method performed in a client. It comprises the steps of requesting a server to perform message transmission, receiving symbols of the client's message from the server, and presenting the received symbols of the message to the user of the client. The client then automatically downloads the body and/or the attachment(s) of the client's message from the server in the background. Also, after the symbols of the message are transmitted to the client, the user of the client is allowed to choose whether to download the message's body and/or attachment(s). For a more detailed description of the steps of this method, refer to the operations performed by the client in the abovementioned symbol-based message transmission method.

Figure 4:
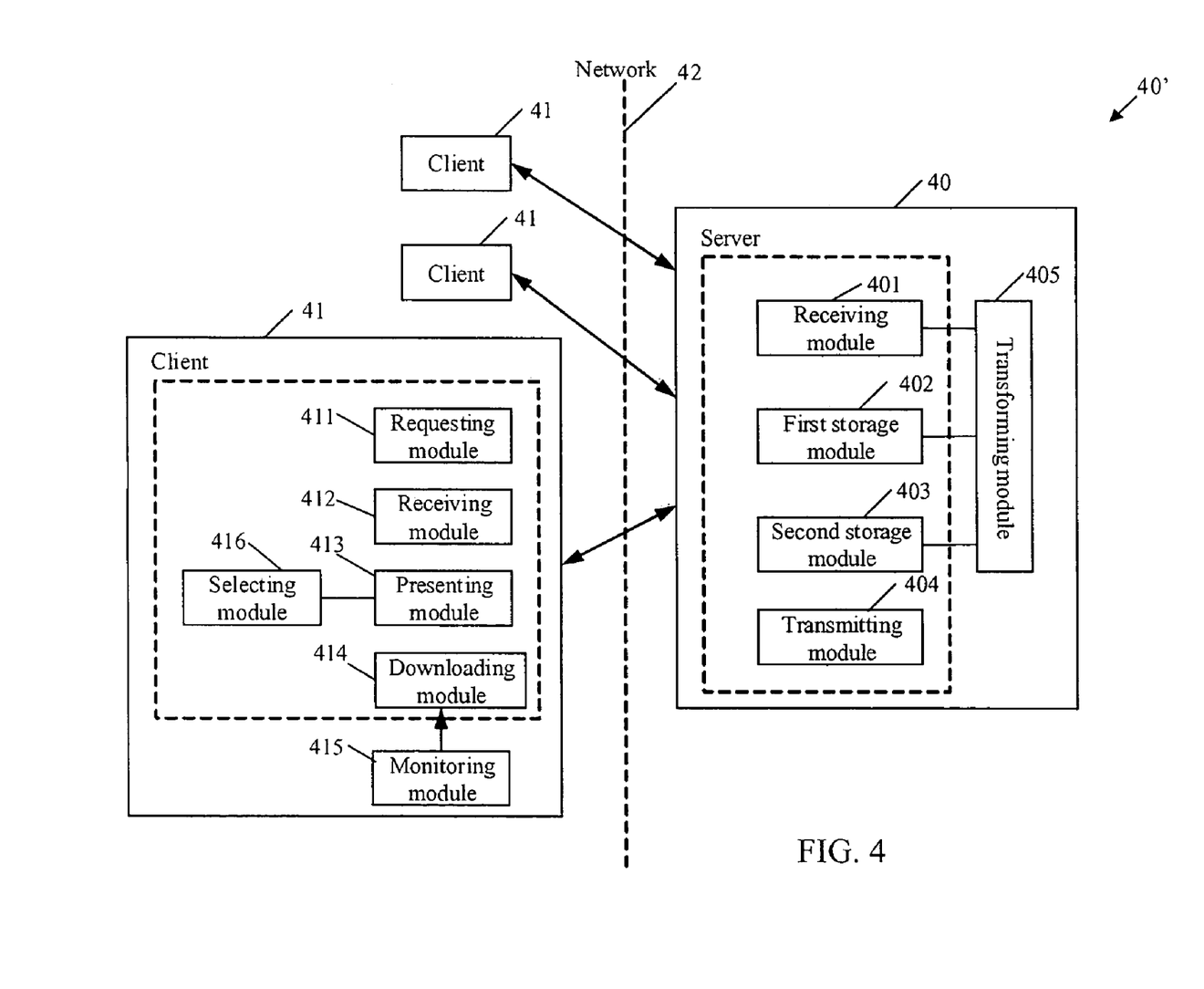
FIG. 4 shows a schematic block diagram of the symbol-based message transmission system in accordance with another embodiment of the present invention.

Referring now to FIG. 4, there is shown a schematic diagram of the symbol-based message transmission system according to another embodiment of the present invention incorporating the same inventive concept. System 40' includes a server 40 and at least one client 41, whereby a client can establish a connection with the server via a network 42 and receives and/or downloads messages from the server. Server 40 transmits the symbols of the message of client 41 to the client after receiving the message transmission request therefrom. The specific structures and functions of server 40 and client 41 are described in detail hereinbelow.

Server 40 comprises a receiving module 401 for receiving a message transmission request from client 41, a first storage module 402 for storing the message of the client, a transforming module 405 for transforming respective portions of the message of the client into a set of symbols, a second storage module 403 for storing the symbols of the message of the client, and a transmitting module 404 for transmitting the symbols of the message of the client to the client according to the message transmission request of the client.

Client 41 comprises a requesting module 411 for requesting server 40 to perform message transmission, a receiving module 412 for receiving symbols of the message of the client from the server, a presenting module 413 for presenting the received symbols of the message to the user of the client, and a downloading module 414 for automatically downloading the body and/or the attachment(s) of the message of the client from the server in the background.

In message transmission system 40', server 40 may actually receive the messages of client 41 from other servers (not shown) via network 42 at any time and store them in first storage module 402 for receiving by the client. When client 41 needs to receive the messages from server 40, the client first establishes a connection therewith. The connection may be accomplished by connecting modules (not shown) in client 41 and server 40. The process of establishing a connection between client 41 and server 40 is well known in the art and further description is not believed necessary.

When client 41 needs to receive messages, requesting module 411 of the client sends a message transmission request to server 40. Preferably the requested message is the portion of the message that has not yet been read by the user of the client. After receiving module 401 of server 40 receives the message transmission request, it searches for the symbols of the messages of client 41 in second storage module 403.

Transforming module 405 transforms respective portions of the message of client 41 stored in first storage module 402 into a set of symbols after receiving the message transmission request from the client. In this embodiment the set of symbols includes three symbols which respectively represent the title, the body and the attachment of the corresponding message. The generated symbols of the message are then stored in second storage module 403.

Transforming module 405 may transform respective portions of the message into a set of symbols, and then stores the generated symbols of the message in second storage module 403 when server 40 receives the client's messages from other servers.

Each message in transforming module 405 is transformed into a symbol set, wherein each symbol takes, for example, the following form: Header ID, Header Address, Header Checker, Header Size, Payload ID, and size. Of course, those skilled in the art will realize that other forms may be used to represent the above symbols.

In one embodiment, the symbol that represents the title is used to indicate the message's name; the symbol that represents the body is used to indicate the size of the message's body; and the symbol that represents the attachment is used to indicate the name, type, and size of the message's attachment. Of course, those skilled in the art will appreciate that these symbols may be used to indicate other information as well.

When the symbols of the messages of client 41 are obtained, these symbols are transmitted to the client through transmitting module 404 of server 40. More specifically, transmitting module 404 transmits the title, the body and the attachment symbols of the message successively so that the user of client 41 clearly knows information such as the number of messages being received, the name of each message, the size of each message's body, and the name, type, and size of each message's attachment(s). Transmitting module 404 may also transmit the symbol set of the messages directly to client 41. Other transmitting manners readily known to those skilled in the art may also be employed.

The received symbols of the messages are presented to the user of client 41 through the presenting module 413 after receiving module 412 of the client receives the symbols of the messages. Since client 41 is usually busy processing the received information, the download communication channels are actually underutilized. That is, there exists large unused channel capacity. Thus, client 41 may automatically download the body and/or the attachment(s) of the messages in full channel capacity in the background through downloading module 414 and make fuller use of the channel capacity. In this way, whenever the user of client 41 decides to read the whole body of the message and/or the attachment(s), the body and/or the attachment(s) are ready without further downloading.

Client 41 also comprises a monitoring module 415 to monitor events that can start an automatic download operation in the background. Downloading module 414 of client 41 starts to automatically download the body and/or the attachment(s) of the message in the background when monitoring module 415 has determined that a start event has occurred. Monitoring module 415 may be implemented via a daemon.

In this embodiment, the start event is either that the user of client 41 begins processing the received symbols of the messages, or the client has received all of the symbols of the messages. Those skilled in the art will appreciate that other start events may also be used.

In one embodiment, downloading module 414 may automatically download the body and/or the attachment(s) of the message in the background according to a predetermined priority algorithm (e.g., an address list priority algorithm, and/or a size priority algorithm). In another embodiment, downloading module 414 automatically downloads the body and/or the attachment(s) of the messages in the background according to the size of the bodies of the messages (e.g., in order of increasing size). In still another embodiment, when the user of client 41 is processing the received symbols of the message, downloading module 414 automatically downloads in the background the body and/or the attachment(s) of the message currently being browsed by the user.

When downloading module 414 of client 41 automatically downloads the body and/or the attachment(s) of the message in the background, transmitting module 404 of server 40 transmits the body and/or the attachment(s) of the message of the client according to the download operation of the client.

Furthermore, client 41 may also comprise a selecting module 416 for allowing the user to select whether to download the body and/or the attachment(s) of the message. In this way, after the symbols that represent the objects of the message are presented through presenting module 413, the user of the client can decide whether to download, select, or delete the corresponding objects according to the network environment and the content and/or size of the objects, thereby controlling the operations of downloading module 414.

Server 40 and client 41 in the symbol-based message transmission system 40' of this embodiment, as well as the components thereof, may be implemented in hardware with devices such as a Very Large Scale Integrated (VLSI) circuit, a gate array, other semiconductors such as logic chips and transistors, and a programmable hardware device such as a field programmable gate array (FPGA) or a programmable logic device (PLD); in software executed by various types of processors; or by a combination of the abovementioned hardware devices and software.

It can be seen from the above description that after server 40 receives the message transmission request from client 41 in the symbol-based message transmission system 40' of this embodiment, the server transmits only the symbols that represent the messages to the client, thereby saving a great deal of communication channel bandwidth. Client 41 then automatically downloads the body and attachment(s) of the message in the background, which can make fuller use of all of the communication channel capacity, thereby efficiently transmitting a message with a large body and/or attachment(s), and solving the problem of uneven utilization of the communication channel capacity in the prior art.

In the specific implementation of the symbol-based message transmission system of this embodiment, system 40' can also be combined with existing message transmission systems (not shown). More specifically, receiving module 401, first storage module 402, second storage module 403 and transmitting module 404 in server 40 may use the corresponding modules of the server in an existing message transmission system. What is needed is to add the corresponding functions on the basis of the existing functions, as shown by the dashed line frame of server 40 in FIG. 4. Requesting module 411, receiving module 412, presenting module 413, downloading module 414 and selecting module 416 in client 41 may use the corresponding modules of the client in an existing message transmission system. What is needed is to add the corresponding functions on the basis of the existing functions, as shown by the dashed line frame of client 41 in FIG. 4.

Although the symbol-based message transmission method and system of the instant invention have been described in detail in conjunction with the above embodiments, since other modifications and changes varied to fit particular requirements and environments will be apparent to those skilled in the art, the invention is not considered limited to examples chosen for purposes of the above described disclosure, and covers all changes and modifications which do not constitute departures from the true spirit and scope of this invention as defined by the appended claims.

What is claimed is:

1. A method of transmitting a message, comprising a message title and a message body, from a server to a client, the steps comprising:
   a) receiving, by the server, a request to transmit the message to the client;
   b) transforming, by the server, the contents within the message body into a first set of symbol(s), the first set of symbol(s) comprising at least one symbol; and
   c) transmitting the first set of symbol(s) of said message from the server to the client.

2. The method as recited in claim 1, further comprising the steps of:
   d) transforming the message title into a second set of symbol(s), the second set of symbol(s) comprising at least one symbol; and
   e) transmitting the symbol(s) of said message to the client.

3. The method as recited claim 1, wherein the message further comprises a message attachment, the method further comprising the following steps:
   d) transforming the message attachment into a second set of symbols(s), the second set of symbol(s) comprising at least one symbol; and
   e) transmitting the second set of symbol(s) of said message to the client.

4. The method as recited in claim 1, wherein message further comprises a message attachment, the method further comprising the following steps:
   d) transforming the message title into a second set of symbol s the second set of symbol(s) comprising at least one symbol; and
   e) transmitting the second set of symbol(s) of said message to the client
   f) transforming the message attachment into a third set of symbol(s), the third set of symbol(s) comprising at least one symbol; and
   g) transmitting the second set of symbol(s) of said message to the client.

5. The method as recited in claim 1, the steps further comprising the step of transmitting the message body, from the server to the client, by automatically downloading the message body in the background by the client from the server subsequent to receipt of the first set of symbol(s) by the client from the server.

6. The method as recited in claim 1, wherein:
   the request is a request to send to the client all unread messages corresponding to the client; and
   steps (b) and (c) are performed for all unread messages corresponding to the client.

7. A method of transmitting a message, comprising a message title and a message body, from a server to a client, the steps comprising:
   a) receiving the message at the server;
   b) receiving, by the server, a request to transmit the message to the client;
   c) transforming, by the server, the contents within the message body into a first set of symbol(s), the first set of symbol(s) comprising at least one symbol; and
   d) transmitting the first set of symbol(s) of said message from the server to the client.

8. The method of claim 7, steps of:
   f) transforming the message title into a second set of symbol(s), the second set of symbol(s) comprising at least one symbol; and
   g) transmitting the second set of symbol(s) of said message to the client.

9. The method as recited in claim 7, wherein the message further comprises a message attachment, the method further comprising the following steps:
   f) transforming the message attachment into a second set of symbol(s), the second set of symbols comprising at least one symbol; and
   g) transmitting the second set of symbol(s) of said message to the client.

10. The method as recited in claim 7, the steps further comprising the step of transmitting the message body, from the server to the client, by automatically downloading the message body in the background by the client form the server subsequent to receipt of the first set of symbol(s) by the client from the server.

11. The method as recited in claim 7, wherein:
    the request is a request to send to the client all unread messages corresponding to the client; and
    steps (b) and (c) are performed for all unread messages corresponding to the client.

12. A method of transmitting a message, with each message comprising a message title and a message body, from a server to a client, the method comprising the steps of:
    a) requesting the server to transmit a first message, comprising a first message body, to the client;
    b) sending a first set of symbol(s), comprising at least one symbol, from the server, with the first set of symbol(s) symbolizing the contents within the first message body;
    c) receiving the first set of symbol(s) of said message from said server by said client;
    d) subsequent to step (c), presenting the first set of symbol (s) to a user of said client;
    e) during step (d), automatically downloading in the background, by the client, the contents within the first message body.

13. The method as recited in claim 12, further comprising the steps of:
    f) receiving, by the client from the server, a plurality of set(s) of symbols, including the first set of symbol(s) received at step (c), with each set of symbol(s) of the plurality of sets of symbol(s) respectively corresponding to a plurality of messages for the client; and
    g) subsequent to step (f), automatically downloading in the background the message body for each message of the plurality of messages, with the order of the automatic downloading of the message bodies being determined based at least in part on message body size.

14. The method as recited in claim 12, wherein step (e) is performed when said client has determined that at least one of: said user is processing the first set of symbol(s).

15. The method as recited in claim 12, further comprising the steps of:
   receiving by the client from the server, a plurality of set(s) of symbols, including the first set of symbol(s) received at step (c), with each set of symbol(s) of the plurality of sets of symbol(s) respectively corresponding to a plurality of messages for the client; and
   g) subsequent to step (f), automatically downloading in the background the message body for each message of the plurality of messages, with the order of the automatic downloading of the message bodies being determined based at least in part on a pre-defined priority algorithm.

16. The method as recited in claim 15, wherein said priority algorithm is an address list priority algorithm.

17. The method as recited in claim 14, wherein the automatic downloading of step (g) is triggered by a user of said client browsing the first message.

18. A server comprising:
   a) receiving means for receiving, from a client, a request to transmit a message to the client;
   b) first storage means for storing said message of said client;
   c) transforming means for transforming portions of said message into a set of symbols representing the contents within a body of said corresponding message;
   d) second storage means for storing said set of symbols; and
   e) transmitting means for transmitting said set of symbols to said client in response to said request to transmit said message.

19. A client comprising:
   a) requesting means for requesting a server to transmit a message;
   b) receiving means for receiving symbols representative contents within the body of said message from said server;
   c) presenting means for presenting said symbols to a user of said client; and
   d) downloading means for automatically downloading in the background the contents within a body of said message from said server.

20. The client as recited in claim 19, further comprising monitoring means for monitoring an event to initiate a background automatic download operation.

21. The client as recited in claim 19, further comprising selecting means for providing a user the option to download at least one of: a body and an attachment of said message.

22. A symbol-based message transmission system comprising:
   a) a server comprising:
      i) receiving means for receiving a request to transmit a message from at least one client;
      ii) first storage means for storing said message of said at least one client;
      iii) transforming means for transforming portions of said message into a set of symbols representing the contents within a body of said corresponding message;
      iv) second storage means for storing said set of symbols; and
      v) transmitting means for transmitting said set of symbols to said at least one client in response to said request to transmit said message; and
   b) at least one client comprising:
      i') requesting means for requesting said server to transmit said message;
      ii') receiving means for receiving said set of symbols representative of said message from said server;
      iii') presenting means for presenting said set of symbols to a user of said client; and
      iv') downloading means for automatically downloading in the background said contents within body of said message from said server.

* * * * *